United States Patent [19]
Bevilacqua et al.

[11] Patent Number: 5,515,407
[45] Date of Patent: May 7, 1996

[54] JET PUMP ASSEMBLY FOR RECIRCULATING COOLANT THROUGH A RECIRCULATION LOOP OF A BOILING WATER REACTOR VESSEL

[75] Inventors: Bruce W. Bevilacqua, Export; Robert E. Meuschke, Monroeville; Edward J. Rusnica, Sr., Hempfield Township, both of Pa.

[73] Assignee: Westinghouse Electric Corporation, Pittsburgh, Pa.

[21] Appl. No.: 295,567

[22] Filed: Aug. 25, 1994

[51] Int. Cl.⁶ .................................................. G21C 15/24
[52] U.S. Cl. ........................ 376/372; 376/379; 376/392; 376/393
[58] Field of Search ........................ 376/372, 379, 376/392, 393, 407; 417/151

[56] References Cited

U.S. PATENT DOCUMENTS

| | | | |
|---|---|---|---|
| 3,378,456 | 4/1968 | Roberts | 176/61 |
| 3,380,649 | 4/1968 | Roberts | 376/372 |
| 3,389,055 | 6/1968 | Hughes | 176/61 |
| 4,151,813 | 5/1979 | Gorzegno et al. | 122/407 |
| 4,394,345 | 7/1983 | De Briere et al. | 376/245 |
| 4,499,691 | 2/1985 | Karazim et al. | 51/241 |
| 4,675,149 | 6/1987 | Perry et al. | 376/260 |
| 4,934,411 | 6/1990 | Albrecht | 137/884 |
| 4,995,158 | 2/1991 | Howell et al. | 29/723 |
| 5,070,589 | 12/1991 | Howell et al. | 29/426.5 |
| 5,124,115 | 6/1992 | Dillmann | 376/372 |
| 5,135,711 | 8/1992 | Borchardt et al. | 376/372 |
| 5,285,486 | 2/1994 | Cowan, II et al. | 376/301 |
| 5,295,171 | 3/1994 | Aburomia et al. | 376/372 |

*Primary Examiner*—Donald P. Walsh
*Assistant Examiner*—Meena Chelliah

[57] ABSTRACT

A jet pump assembly for recirculating coolant through a recirculation loop of a boiling water reactor vessel, the jet pump assembly comprises a jet pump in operative association with the recirculation loop for forcing the coolant through the recirculation loop. A beam is positioned adjacent and in operative association with the jet pump for assisting in maintaining the positional relationship of the jet pump. A bolt is inserted in the beam for resisting the hydraulic forces generated in the jet pump, and an insert is disposed in said beam for receiving and surrounding the bolt which, in turn, reduces stress on the beam.

19 Claims, 3 Drawing Sheets

JET PUMP ASSEMBLY FOR RECIRCULATING COOLANT THROUGH A RECIRCULATION LOOP OF A BOILING WATER REACTOR VESSEL

FIELD OF THE INVENTION

The present invention relates generally to a jet pump assembly having a jet pump structurally supported in an annulus of a boiling water reactor by a holddown assembly which includes a beam positioned upwardly above the jet pump and having a bolt through the beam and in abutting contact with the jet pump for resisting the hydraulic forces generated in the jet pump and, more particularly, relates to an improved jet pump assembly having an insert positioned surrounding the bolt in the beam for reducing stress and having the bolt held rotationally immobile in its operating position by a reusable and corrosion resistant locking device.

BACKGROUND OF THE RELATED ART

A conventional jet pump assembly includes a body with three distinct regions, mainly an inlet or suction section, a throat or a mixing chamber of substantially uniform cross-sectional area throughout its length, and a diffuser which increases in cross-sectional area in the direction of flow. A nozzle is positioned in the inlet section to convert a high-pressure stream of driving fluid into a high-velocity, low-pressure jet of driving fluid which flows coaxially through the inlet section and into the mixing chamber. The high-velocity jet is at a much lower pressure than fluid surrounding the nozzle in the vicinity of the inlet section so driven fluid is sucked into the pump inlet by the jet. A converging housing on the inlet section and surrounding the nozzle directs the driven fluid or suction flow into the mixing chamber. Within the mixing chamber, the high-velocity jet of driving fluid gradually widens as an entrainment-mixing process takes place with the driven fluid or suction stream. The mixing transfers momentum from the jet driving stream to the driven suction stream, so static pressure in the combined stream rises. In theory, the mixing chamber ends after a uniform velocity profile is achieved, and this usually occurs shortly after the widening driving jet stream touches the mixing chamber walls. From the relatively small cross-sectional area mixing chamber, the merged driving and driven fluids flow into the diffuser of increasing cross section in the direction of flow, further increasing pump discharge pressure as the velocity of the merged fluids is reduced to convert the maximum amount of velocity head to static head or pressure.

Since the jet pump has no mechanical moving parts, it is well suited for forced circulation of coolant typically water, in a boiling water reactor vessel where long and trouble-free operation is required because of the radiation, which makes pump repair or replacement difficult and expensive.

Most boiling water reactors typically have a plurality of jet pumps mated in pairs. Each mated pair works in conjunction with its respective mated jet pump for recirculating the reactor coolant. A riser is connected to each mated pair for providing a passageway of the coolant to each jet pump of the mated pair. The riser includes a vertically oriented stem portion for receiving the coolant, and the stem portion branches into distinct U-shaped flow channels which respectively attach to a nozzle of the mated pair of pumps, as previously discussed.

Unfortunately, the jet pumps create a large and upwardly hydraulic force caused by the coolant thrusting up through the riser and against the interior of the two U-shaped flow channels. This hydraulic force is typically mitigated by a holddown assembly attached to the riser. The holddown assembly includes a pair of spaced apart arms which are respectively attached to opposite sides of the riser, and extend upwardly from the channels. A beam is placed between the arms which, in conjunction with the beam, form a generally U-shaped structure surrounding the top of the channels. A bolt extends through and threads into the beam and abuts the junction of the two channels for resisting the upward force of the coolant flowing through the channels. A rectangular shaped weld plate having an annular transverse cross section portion extending from its center portion slips over the bolt for preventing rotational movement of the bolt once it is threaded into the beam. The annular shaped transverse cross section portion receives the bolt, and the weld plate is welded onto the beam.

Although the presently known and utilized holddown assembly and weld plate are satisfactory, they are not without drawbacks. The holddown assembly is susceptible to cracking which is caused by the harsh environment of the boiling water reactor vessel. In addition, if the holddown assembly needs to be removed for maintenance and the like, the weldment of the weld plate must be grounded out by a suitable tool which renders it unusable after this removal. Therefore, a new weld plate must be installed when the holddown assembly is re-installed.

Consequently, a need exists for an improved jet pump assembly which eliminates damaging the weld plate during removal and eliminates stress corrosion cracking.

SUMMARY OF THE INVENTION

The present invention provides an improvement designed to satisfy the aforementioned needs. More particularly, a jet pump assembly for recirculating coolant through a recirculation loop of a boiling water reactor vessel, the jet pump assembly comprises (a) a jet pump in operative association with the recirculation loop for forcing the coolant through the recirculation loop; (b) a beam positioned adjacent and in operative association with said jet pump for assisting in maintaining the positional relationship of said jet pump; (c) a bolt inserted in said beam for resisting the hydraulic forces generated in said jet pump; and (d) an insert disposed in said beam for receiving and surrounding said bolt which, in turn, reduces stress on said beam.

It is an object of the present invention to provide a holddown assembly which mitigates stress cracking and which is reusable after disassembly for maintenance and the like.

It is a feature of the present invention to provide a holddown assembly having an insert disposed in a beam for receiving and surrounding a bolt which, in turn, reduces stress on the beam.

It is an advantage of the present invention to provide a holddown assembly which may be temporarily disengaged without complete disassembly of the holddown assembly for allowing adjustment of the bolt.

These and other objects, features and advantages will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which.

PREFERRED EMBODIMENT(S) OF THE INVENTION

Figure 1:
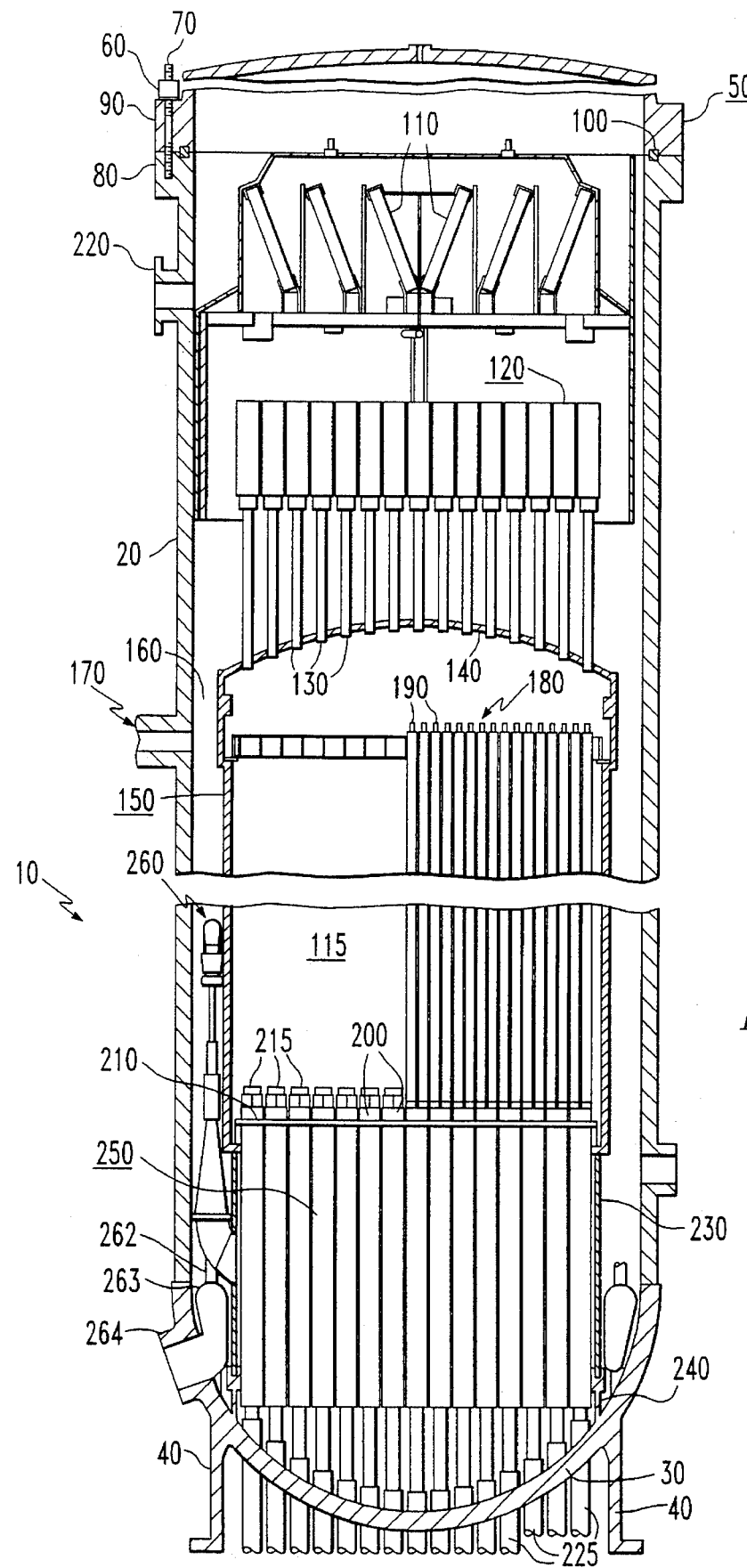
FIG. 1 is a view in vertical cross section of a typical boiling water reactor.

In the following description, like reference characters designate like or corresponding parts throughout the several views of the drawings. Also, in the following description, it is to be understood that such terms as "forward," "left," "right," "upwardly," "downwardly," and the like are words of convenience and are not to be construed as limiting terms.

Referring to FIG. 1, a reactor vessel 10 is shown for converting water to steam and includes an upright cylindrical pressure housing 20. The lower end of the vessel 10 is closed by a dish-shaped bottom head 30 having downwardly extending feet 40 which rest on a foundation (not shown), typically a floor, and the upper end of the vessel 10 is closed by a removable dome-shaped top head 50 secured to the upper end of the vessel 10 by a plurality of nuts 60 and stud bolts 70 attached to outwardly extending respective flanges 80 and 90 of the housing 20 and top head 50. The top head 50 is sealed by gaskets 100 to the upper end of the housing 20 to make a pressure-tight fit. Steam dryer panels 110, which may be of a conventional type, are mounted in the upper end of the vessel 10 for drying the steam as it passes therethrough. Water is maintained in the lower portion 115 of the vessel 10 for providing a medium which will convert to steam.

Steam separators 120, which also may be of conventional construction, are mounted in the vessel 10 just below the steam dryer panels 110 for separating the properly dried steam from the steam containing water in excess of a predetermined amount.

A plurality of separator vapor tubes 130 extend down respectively from each steam separator 120 and is sealed through a steam plenum cap 140 of a cylindrical shroud 150 disposed coaxially within the housing 20 to leave an upright space or downcomer annulus 160 between the shroud 150 and the housing 20. Feed water is supplied to the reactor vessel 10 through four feed water sparger nozzles 170 (only one sparger nozzle is shown) located at equal intervals in a horizontal plane. A reactor core fuel assembly 180 is made up of a ,plurality of elongated vertical fuel assemblies 190. The fuel assemblies 190 are arranged in groups of four, with the lower end of each fuel assembly 190 in each group resting on a vertical respective control rod guide tube 200 sealed at its upper end through a horizontal bottom grid plate 210 mounted across the bottom of the shroud 150. Each guide tube 200 extends down below the bottom grid plate 210, and a separator control rod 215 is mounted in each control rod guide tube 200 to slide longitudinally up and down between the four adjacent elongated vertical fuel assemblies 190 resting on the grid tube 200. Thimble tubes 225 are positioned in the lower portion of the reactor vessel 10 for receiving control rods (not shown) which control the nuclear reaction in the reactor vessel.

Water flows upwardly through the fuel assemblies 190 where water changes to steam, and then passes as a steam-water mixture out the vapor tubes 130 and through the steam separators 120. Water separated from the steam in the separators 120 is returned to the downcomer annulus 160. Steam passes the steam drier panels 110, and leaves the vessel 10 through a steam outlet 220 to pass through a conventional steam turbine and condenser (both of which are not shown), as is well known in the art. Condensed steam is returned from the condenser to the feed water sparger nozzles 170 by a conventional pump (not shown).

The lower end of the shroud 150 is welded to the upper end of a cylindrical shroud support skirt 230, the lower end of which is welded to an annular ring 240 formed integrally with the bottom head 30 of the vessel 10. A core inlet plenum chamber 250 is formed within the shroud support skirt 230 and between the bottom grid plate 210 and the bottom head 30 of the vessel 10.

A plurality of upright jet pumps 260 (only one is shown) are typically mated in pairs and are mounted in the downcomer annulus 160 between the shroud 150 and the housing 20. The jet pumps 260 are identical and only one pair of jet pumps will be described in detail hereinbelow. Each mated pair of jet pumps 260 is connected to a riser 262 which is served by a pair of distribution manifolds 263 for providing a passageway for coolant to flow to the jet pumps 260. Each manifold 263 is supplied water under pressure from a separate conventional recirculation pump (not shown) through an inlet 264.

Figure 2:
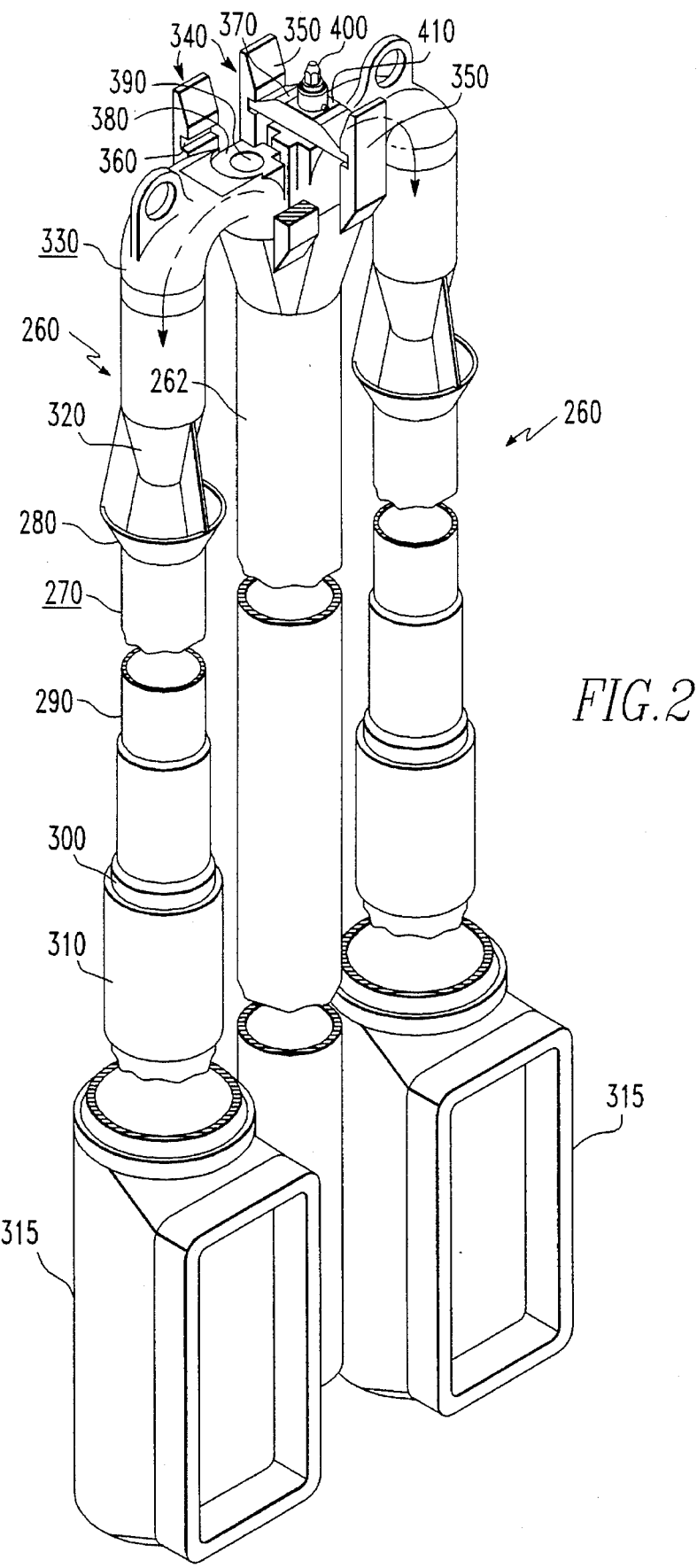
FIG. 2 is a perspective view of a mated pair of jet pumps in a boiling water reactor having a holddown assembly attached thereto.

Referring to FIG. 2, each jet pump 260 includes an elongated vertical hollow body 270 which includes an inlet or suction entrance 280 at its upper end. The suction entrance 280 converges downwardly into a straight cylindrical throat or mixing chamber 290, which merges at its lower end into an outwardly diverging diffuser 300. The suction entrance 280, throat 290 and upper portion of the diffuser 300 are welded together to form an integral unit. The lower end of this integral unit makes a slip fit into a circular fitting 310 secured to the lower portion of the diffuser 300. A connector 315 is attached to each fitting 310 for providing a means of allowing the fluid flowing therein to be injected into the lower portion 115 of the reactor vessel 10.

A separator jet pump nozzle 320 is secured at the suction entrance 280 of each jet pump 260 to direct a jet of high-velocity driving fluid or water into the suction entrance 280. The internal diameter of the nozzle 320 is reduced so that the water velocity increases with a corresponding decrease in pressure. This reduction in pressure causes driven fluid to be sucked into the suction entrance 280 of the pump 260 where it is mixed with the high-velocity jet in the throat or mixing section 290. The driving and driven fluids are substantially completely mixed by the time they reach the upper end of the diffuser 300, and they begin to reduce in speed and increase in static pressure as they move out of the diffuser 300.

Preferably, the jet pump nozzles 320 are mated in pairs as previously stated. Each nozzle 320 in a pair includes an arcuate shaped elbow 330 which extends to the vertical riser 262. The pair of elbows 330 form two separate U-shaped flow channels each providing a flow passageway to its respective nozzle, as indicated by the dashed arrows.

A holddown assembly 340 is attached to each elbow 330 for resisting the upwardly extending hydraulic pressure created on the elbows 330 by the coolant flowing therethrough. Each holddown assembly 340 includes a pair of spaced apart arms 350 extending upwardly to an elevation slightly greater than the elbows 330. A slit 360 extends across each arm 350 for receiving a beam 370 which is respectively positioned between the pair of arms 350. A lip portion 380 is integrally attached to the exterior of each elbow 330 and includes a notched out portion 390 for receiving a bolt 400 which extends through the beam 370 and into the notched out portion 390. The bolt 400 is torqued into the beam 370 for creating a downwardly extending force on the elbows 330 for countering the upwardly created hydraulic pressure. A base plate 410 rests on the beam 370 and includes a hole (not shown) through its center portion for receiving the bolt 400.

Figure 3B:
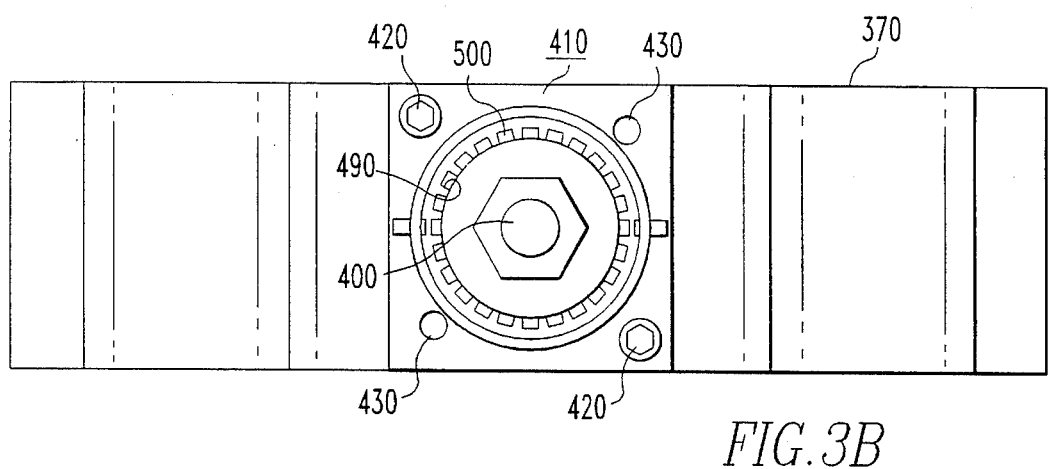
FIG. 3B is a view taken along line 3B—3B of FIG. 3A.
Figure 3A:
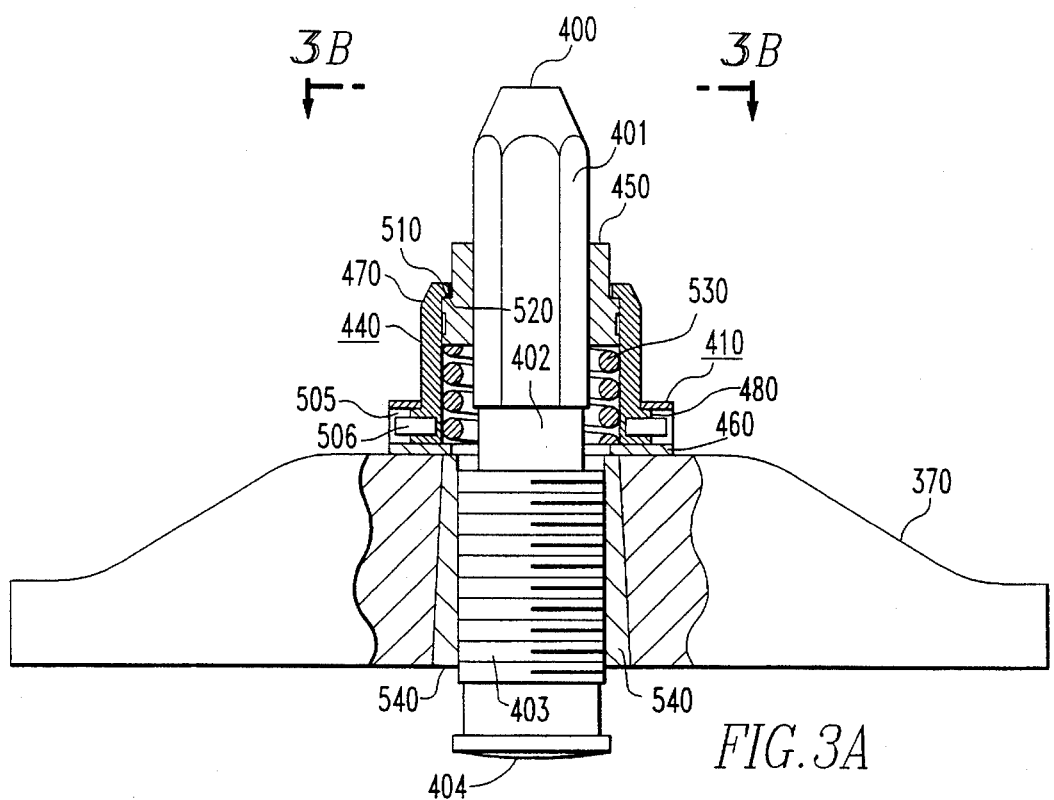
FIG. 3A is a view in partial vertical cross section of a portion of the holddown assembly.

Referring to FIGS. 3A and 3B, an exploded view of the bolt 400 is illustrated. The bolt 400 includes a hexagon shaped top portion 401, a circular shaped middle portion 402 and a threaded bottom portion 403 having an enlarged end portion 404 which projects into and is matingly received by the notched-out portion 390 of the elbow 330 (see FIG. 2). The base plate 410 is attached to the beam 370 by two bolts 420 respectively disposed on opposite corners of the base plate 410 and by two dowel pins 430 protruding from the base plate 410 and through the other two opposite corners of the base plate 410. The beam includes two holes (not shown) for respectively receiving the dowel pins 430. The bolts 420 are countersunk into the base plate 410 and the dowel pins 430 are flush with the top surface of the base plate 410 so that neither projects upwardly above the base plate 410.

A housing 440 and lock cup 450 are attached to the base plate 410 for preventing rotational movement of the bolt 400 once it is inserted in the beam 370, as will be described in detail hereinbelow. An annular shaped washer 460 is placed on the beam 370 and matingly receives the bolt 400 through its hole therethrough for preventing slippage of the devices mounted thereon. The washer 460 also includes two holes (not shown) therethrough for allowing the dowel pins 430 to pass therethrough. The housing 440 includes an annular shaped body 470 with an outwardly extending flange 480 which rests on the washer 460. The base plate 410 is mounted to the beam 370 as previously stated. The housing 440 includes an interior side wall having a plurality of notches 490. The lock cup 450 is placed partially in the interior of the housing 440 and includes an exterior wall having a plurality of teeth 500 which respectively mate with the notches 490 on the side wall. The interior wall of the lock nut 450 has a shape which conforms to the shape of the bolt 400 for preventing movement of the bolt 400 within the lock cup 450. It is instructive to note that, when the teeth 500 engage the notches 490, they cooperatively prevent the bolt 400 from rotating. A space 506 is created between the washer 460 and the base plate 410 wherein two dowel pins 506 are received. Each dowel pin 506 respectively extends into a hollowed-out portion 505 and into slots in the flange 480 for allowing a suitable tool (not shown) to grasp either dowel pin 506 and horizontally rotate it. This motion adjusts the position of the housing 440 for allowing the mating of the teeth 500 and notches 490 to be adjusted. The housing 440 further includes a shoulder 510 which abuts against a lip portion 520 of the lock cup 450 for preventing the lock nut 450 from slipping upwardly out of the housing 440. The lock cup 450 is preferably made of a precipitation hardened iron based alloy having .10% cobalt. A spiral shaped spring 530 is positioned in the interior of the housing 440 and pushes the lip portion 520 against the shoulder 510 for preventing the lock cup 450 from sliding downwardly into the housing. A suitable tool may be used to press the lock cup 450 downwardly which, in turn, depresses the spring 530 for allowing the lock cup 450 to be lowered into the housing 440. When in this lowered position, the teeth 500 of the lock cup 450 is downwardly from the notches 490 on the housing or, in other words, disengaged; this allows the lock cup 450 and, in turn, the bolt 400 to be rotated. The bolt 400 may then be rotated for adjusting the tension the bolt 400 applies to the lip portion 380 (see FIG. 2).

A tapered insert 540 is inserted into the hole of the beam 370 and matingly receives the bolt 400 for reducing stress the bolt 400 applies to the beam 370. The insert is tapered so that it substantially conforms to the shape of the hole, and if necessary, the hole is reamed to this shape in plants in which the insert is to be retrofitted. The insert 540 of the preferred embodiment may be composed of 316 stainless steel. The bolt 410 is threaded into the insert 540 for allowing it to be supported by the insert 540. It is also instructive to note that the beam 370 has a thickness of 2.60 for providing the optimum thickness for preventing stress cracks in the beam 370.

It is thought that the present invention and many of its attendant advantages will be understood from the foregoing description and it will b apparent that various changes may be made in the form, construction and arrangement without departing from the spirit and scope of the invention or sacrificing all of its material advantages, the form hereinabove described being merely a preferred or exemplary embodiment thereof.

We claim:

1. A jet pump assembly for recirculating coolant through a recirculation loop of a boiling water reactor vessel, the jet pump assembly comprising:

(a) a jet pump for forcing the coolant through the recirculation loop;

(b) a beam positioned in operative association with said jet pump for assisting in maintaining the positional relationship of said jet pump, said beam having a hole;

(c) a bolt inserted in said hole of said beam for connecting said beam to said jet pump; and (d) an insert disposed in said hole in said beam for receiving and surrounding said bolt which, in turn, reduces stress on said beam induced by the hydraulic forces generated in said jet pump, said insert maintained in compression between said bolt and said beam.

2. The jet pump assembly as in claim 1 further comprising:

(a) a lock cup adapted to receive said bolt for assisting in preventing rotational movement of said bolt; and (b) a housing attached to said beam and mated with said lock cup so that said housing receives said lock cup in its interior portion for, in cooperation with said lock cup, preventing rotational movement of said bolt.

3. The jet pump as in claim 2 wherein said lock cup includes a plurality of teeth around its outer periphery for mating with said housing.

4. The jet pump as in claim 3 wherein said housing includes a plurality of notches around its inner periphery which matingly mesh with the plurality of teeth for substantially preventing rotational movement of said lock cup within said housing.

5. The jet pump assembly as in claim 4 further comprising a spring positioned in the interior of said housing for maintaining the positional relationship of said lock cup in said housing and for allowing said lock cup to be depressed into said housing for allowing rotational movement of said bolt when said lock cup is depressed.

6. The jet pump assembly as in claim 5, wherein said lock cup includes an interior portion having a shape conforming substantially to the shape of said bolt for matingly receiving said bolt.

7. The jet pump assembly as in claim 6 further comprising a base plate operatively attached to said beam and receiving said housing for maintaining the positional relationship of said housing.

8. The jet pump assembly as in claim 7, wherein said lock cup is comprised of a precipitation hardened iron based alloy.

9. The jet pump assembly as in claim 8, wherein said lock is comprised of less than 0.10% cobalt.

10. The jet pump assembly as in claim 9, wherein said beam has a thickness of 2.6 inches.

11. A jet pump assembly for recirculating coolant through a recirculation loop of a boiling water reactor vessel, the jet pump assembly comprising:

(a) a core shroud disposed in the interior of the boiling water reactor vessel for defining an annulus between said core shroud and the boiling water reactor vessel;

(b) a jet pump positioned in the annulus for forcing the coolant through the recirculation loop;

(c) a pair of arms in a spaced apart relationship with each other disposed adjacent and in operative association with said jet pump for assisting in maintaining the positional relationship of said jet pump;

(d) a beam disposed between said pair of arms for assisting in maintaining the positional relationship of said jet pump;

(e) a bolt inserted in said beam for, in cooperation with said beam and said pair of arms, resisting the hydraulic forces generated in said jet pump;

(f) a lock cup adapted to receive said bolt for assisting in preventing rotational movement of said bolt; and (g) a housing attached to said beam and mated with said lock cup so that said housing receives said lock cup in its interior portion for, in cooperation with said lock cup, preventing rotational movement of said bolt.

12. The jet pump as in claim 11 wherein said lock cup includes a plurality of teeth around its outer periphery for mating with said housing.

13. The jet pump as in claim 12 wherein said housing includes a plurality of notches around its inner periphery which matingly mesh with the plurality of teeth for substantially preventing rotational movement of said lock cup within said housing.

14. The jet pump assembly as in claim 13 further comprising a base plate adapted to receive said housing and attached to said beam for maintaining the positional relationship of said housing.

15. The jet pump assembly as in claim 14 further comprising a dowel pin inserted into said base plate and beam for attaching the base plate and beam together.

16. The jet pump assembly as in claim 15 wherein said housing includes a lip portion disposed between said beam and said base plate for structurally attaching said housing to both said base plate and beam.

17. A method for retrofitting a jet pump assembly for reducing stress in the jet pump assembly, comprising the steps of:

(a) reaming a beam positioned adjacent and in operative communication with a jet pump for enlarging a hole in the beam; and (b) positioning an insert in the beam for receiving and surrounding a bolt disposed in the beam which, in turn, reduces stress in the beam.

18. The method as in claim 17, wherein step (a) includes reaming a tapered hole in the beam for receiving the insert.

19. The method as in claim 18 further comprising the step of forming a tapered insert which is matingly inserted into the tapered hole in the beam.

* * * * *